(12) United States Patent
Lapierre

(10) Patent No.: US 10,634,815 B1
(45) Date of Patent: Apr. 28, 2020

(54) ITERATIVE DETERMINATION OF DECLINE CURVE TRANSITION IN UNCONVENTIONAL RESERVOIR MODELLING

(71) Applicant: Shale Specialists, LLC, Houston, TX (US)

(72) Inventor: Scott Lapierre, Houston, TX (US)

(73) Assignee: Shale Specialist, LLC, Houston, TX (US)

( * ) Notice: Subject to any disclaimer, the term of this patent is extended or adjusted under 35 U.S.C. 154(b) by 0 days.

(21) Appl. No.: 16/542,927

(22) Filed: Aug. 16, 2019

(51) Int. Cl.
  G06F 17/18 (2006.01)
  G01V 99/00 (2009.01)
  E21B 41/00 (2006.01)
  G06G 7/57 (2006.01)
  E21B 43/00 (2006.01)

(52) U.S. Cl.
  CPC ........ G01V 99/005 (2013.01); E21B 41/0092 (2013.01); G06F 17/18 (2013.01); E21B 43/00 (2013.01); G06F 2217/16 (2013.01); G06G 7/57 (2013.01)

(58) Field of Classification Search
  None
  See application file for complete search history.

(56) References Cited

U.S. PATENT DOCUMENTS

| | | | |
|---|---|---|---|
| 5,612,493 A | | 3/1997 | Alexander |
| 6,101,447 A | * | 8/2000 | Poe, Jr. .......... E21B 49/00 702/13 |
| 6,842,700 B2 | * | 1/2005 | Poe .......... E21B 49/00 702/13 |
| 7,369,979 B1 | * | 5/2008 | Spivey .......... E21B 43/14 702/12 |
| 10,012,056 B1 | * | 7/2018 | Lapierre .......... E21B 49/08 |
| 2007/0133852 A1 | * | 6/2007 | Collins .......... A61B 8/08 382/128 |
| 2009/0020284 A1 | | 1/2009 | Graf et al. |

(Continued)

OTHER PUBLICATIONS

H. Zhang, D. Rietz, A. Cagle, M. Cocco, and J. Lee, "Extended exponential decline curve analysis", 2016, pp. 402-413 (Year: 2016).*

(Continued)

*Primary Examiner* — Kibrom K Gebresilassie
(74) *Attorney, Agent, or Firm* — Craige Thompson; Thompson Patent Law; Vincent Musgrove

(57) ABSTRACT

Apparatus and associated methods relate to computerized system for predicting the quantity of oil and/or gas production at an oil site, where a prediction curve for oil and/or gas data transitions from a first fitted curve (e.g., a hyperbolic decline curve) to a second fitted curve (e.g., an exponential decline curve) at a transition point, the transition point being determined by progressively/iteratively identifying curvature changes in the first fitted curve over an initial time period by comparing a running list of terminal decline rates (Dmin) with a predetermined curvature threshold, and setting the occurrence of the transition point at the point where the rate of change of the terminal decline rate is less than the predetermined curvature threshold. In an illustrative example, the second fitted curve may use the value of Dmin that minimizes the deviation between successive forecasts.

20 Claims, 12 Drawing Sheets

(56) References Cited

U.S. PATENT DOCUMENTS

| | | | | |
|---|---|---|---|---|
| 2010/0312536 | A1* | 12/2010 | Vaal | E21B 43/12 703/10 |
| 2011/0307227 | A1* | 12/2011 | Poe | E21B 43/00 703/2 |
| 2014/0121976 | A1* | 5/2014 | Kischkat | E21B 49/082 702/11 |
| 2014/0136111 | A1* | 5/2014 | Rossi | E21B 43/00 702/6 |
| 2016/0090836 | A1* | 3/2016 | Wang | E21B 49/08 702/12 |
| 2018/0202264 | A1* | 7/2018 | Sarduy | E21B 49/008 |
| 2018/0293336 | A1* | 10/2018 | Tao | G06F 17/5009 |
| 2019/0251460 | A1* | 8/2019 | Lam | E21B 43/30 |

OTHER PUBLICATIONS

Types of decline analysis in production forecasting, PetroWiki, n.d., [online], [retrieved on Nov. 8, 2018]. Retrieved from the Internet <https://petrowiki.org/Types_of_decline_analysis_in_production_forecasting>.
Decline Analysis, IHS Harmony, Nov. 30, 2017, [online], [retrieved on Nov. 8, 2018]. Retrieved from the Internet <https://www.ihsenergy.ca/support/documentation_ca/Harmony/Default.htm#html_files/performing_an_analysis/decline_analysis/decline.htm%3FTocPath%3DPerforming%2520an%2520Analysis%7CDecline%2520Analysis%7C_____0>.
Traditional Decline Analysis Theory, IHS Inc., 2014, [online], [retrieved on Nov. 8, 2018]. Retrieved from the Internet (http://www.fekete.com/SAN/WebHelp/FeketeHarmony/Harmony_WebHelp/Content/HTML_Files/Reference_Material/Analysis_Method_Theory/Traditional_Decline_Theory.htm>.
Forecasting shale oil production, Oil and Gas Journal, Jul. 11, 2013, [online], [retrieved on Nov. 8, 2018]. Retrieved from the Internet <https://vow.ogj.com/home/article/17293079/forecasting-shale-oil-production>.
Juan Manuel Lacayo Ortiz, Pressure Normalization of Production Rates Improves Forecasting Results, thesis, Texas A&M University, Aug. 2013, [online], [retrieved on Nov. 8, 2018]. Retrieved from the Internet <http://oaktrust.library.tamu.edu/bitstream/handle/1969.1/151370/LACAYOORTIZ-THESIS-2013.pdf?sequence=1 >.
Makinde F.A, Orodu O.D., Ladipo A. O. and Anawe P.A.L., Cumulative Production Forecast of an Oil Well Using Simplified "Hyperbolic-Exponential" Decline Models, Global Journal of Researches in Engineering: General Engineering, vol. 12 Issue 2 Version 1.0, May 2012, Global Journals Inc., United States, [online], [retrieved on Nov. 8, 2018]. Retrieved from the Internet <https://globaljournals.org/GJRE_Volume12/4-Cumulative-Production-Forecast-of-An-Oil.pdf >.
Tan Tran, Bakken Shale Oil Production Trends, Master's thesis, Texas A&M University, May 2011, [online], [retrieved on Nov. 8, 2018]. Retrieved from the Internet <http://oaktrust.library.tamu.edu/handle/1969.1/ETD-TAMU-2011-05-9138>.
Analysis Methods: Traditional, fekete.com, Dec. 26, 2010, [online], [retrieved on Nov. 8, 2018]. Retrieved from the Internet (http://www.pandai.com/faq/decline_curve_analysis_fekete.pdf >.
Linnea Lund, Decline Curve Analysis of Shale Oil Production: The Case of Eagle Ford, Uppsala Universitet, Oct. 2014, [online], [retrieved on Nov. 8, 2018]. Retrieved from the Internet <https://uu.diva-portal.org/smash/get/diva2:762320/FULLTEXT01.pdf>.
Purvi Indras, Applying Decline Curve Analysis in the Liquid-Rich Shales: Eagle Ford Shale Study, thesis, Texas A&M University, May 2014, [online], [retrieved on Nov. 8, 2018]. Retrieved from the Internet <http://oaktrust.library.tamu.edu/bitstream/handle/1969.1/152507/INDRAS-THESIS-2014.pdf?sequence=1>.
Arne Bang Huseby and Nils F. Haavardsson, Multisegment Production Profile Models, a Hybrid System Approach, University of Oslo, No. X, Nov. 2006, [online], [retrieved on Nov. 8, 2018]. Retrieved from the Internet <http://www.uio.no/studier/emner/matnat/math/STK2400/h06/undervisningsmateriale/multi_seg.pdf>.
Ram G. Agarwal, David C. Gardner, Stanley W. Kleinsteiber, and Del D. Fussell, Analyzing Well Production Data Using Combined-Type-Curve and Decline-Curve Analysis Concepts, SPE Reservoir Eval. & Eng., Oct. 1999, [online], [retrieved on Nov. 8, 2018]. Retrieved from the Internet <https://wenku.baidu.com/view/77c38fd6c1c708a1284a44a2.html>.
D. Ilk, J.A. Rushing, A.D. Perego, and T.A. Blasingame, Exponential vs. Hyperbolic Decline in Tight Gas Sands—Understanding the Origin and Implications for Reserve Estimates Using Arps' Decline Curves, SPE International, 2008 Annual Technical Conference and Exhibition, Denver, Colorado, USA, Sep. 2008, [online], [retrieved on Nov. 8, 2018]. Retrieved from the Internet <http://www.pe.tamu.edu/blasingame/data/z_Rate_Time_Spreadsheet/References/SPE_116731_(Ilk_et_al)_Power_Law_Exponential_Relation_%5BwPres%5D.pdf>.
Allen Gilmer, Delaware Basin and Bubble Points?, LinkedIn, Aug. 23, 2017, [online], [retrieved on Nov. 8, 2018]. Retrieved from the Internet <https://www.linkedin.com/pulse/delaware-basin-bubble-points-allen-gilmer>.
Laurentian Research, Understanding GOR in Unconventional Play: Permian and Beyond, Seeking Alpha, Aug. 9, 2017, [online], [retrieved on Nov. 8, 2018]. Retrieved from the Internet <https://seekingalpha.com/article/4096835-understanding-gor-unconventional-play-permian-beyond?utm_content=buffere07bf&utm_medium=social&utm_source=linkedin.com&utm_campaign=buffer>.
Wood Mackenzie, Crude for Thought—Pioneer and Permian GORs, SoundCloud, 2017, [online], [retrieved on Nov. 8, 2018]. Retrieved from the Internet <https://soundcloud.com/woodmackenzie/crude-for-thought-pioneer-and-permian-gors>.
Matthew Dilallo, 4 Things Pioneer Natural Resources Wants You to Know About What's Really Happening in the Permian Basin, The Motley Fool, Aug. 14, 2017, [online], [retrieved on Nov. 8, 2018]. Retrieved from the Internet <https://www.fool.com/investing/2017/08/14/4-things-pioneer-natural-resources-wants-you-to-kn.aspx>.
SA Transcripts, Approach Resources' (AREX) CEO Ross Craft on Q2 2014 Results—Earnings Call Transcript, Seeking Alpha, Aug. 5, 2014, [online], [retrieved on Nov. 8, 2018]. Retrieved from the Internet <https://seekingalpha.com/article/2384125-approach-resources-arex-ceo-ross-craft-on-q2-2014-results-earnings-call-transcript>.
SA Transcripts, Pioneer Natural Resources' (PXD) CEO Tim Dove on Q1 2017 Results—Earnings Call Transcript, Seeking Alpha, May 5, 2017, [online], [retrieved on Nov. 8, 2018]. Retrieved from the Internet <https://seekingalpha.com/article/4069807-pioneer-natural-resources-pxd-ceo-tim-dove-q1-2017-results-earnings-call-transcript>.
SA Transcripts, Pioneer Natural Resources' (PXD) CEO Timothy Dove on Q2 2017 Results—Earnings Call Transcript, Seeking Alpha, Aug. 2, 2017, [online], [retrieved on Nov. 8, 2018]. Retrieved from the Internet <https://seekingalpha.com/article/4093890-pioneer-natural-resources-pxd-ceo-timothy-dove-q2-2017-results-earnings-call-transcript?part=single>.
Wajid Yousuf and Thomas A. Blasingame, New Models for Time-Cumulative Behavior of Unconventional Reservoirs—Diagnostic Relations, Production Forecasting, and EUR Methods, Unconventional Resources Technology Conference, San Antonio, Texas, U.S., Aug. 2016, [online], [retrieved on Nov. 8, 2018]. Retrieved from the Internet <http://www.pe.tamu.edu/blasingame/data/0_TAB_Public/TAB_Publications/URTeC_2461766_(Yousuf)_New_Models_Time_-Cumulative_Behavior_%20Uncon_Reservoirs_[wPres]_(pdf).pdf>.
Drillinginfo, Pre-Calculated, Prioprietary EUR Database from Dillinginfo, Drillinginfo, whitepaper, Oct. 2016, [online], [retrieved on Nov. 8, 2018]. Retrieved from the Internet <https://1dhqyu3drpye39jm482ecnjl-wpengine.netdna-ssl.com/wp-content/uploads/2017/11/WP_EUR_Customer-print.pdf>.
Scott Lapierre, On the Nature of Widespread Shale Production Shortfalls Reported by the Wall Street Journal, Journal of Petroleum Resources Economics, Issue 3, May 2019, 17 pages, Society of Petroleum Resources Economists, United States.
M.J. Fetkovich, Decline Curve Analysis Using Type Curves, Journal of Petroleum Technology, Jun. 1980, [online], [retrieved on Nov. 8, 2018]. Retrieved from the Internet <http://www.pe.tamu.edu/blasingame/data/z_zCourse_Archive/P324_06A/P324_06A_w_Work/Prob_13c2_P324_06A_Course_Work_(Ref_SPE_004629_Fetkovich_JPT).pdf>.

* cited by examiner

ITERATIVE DETERMINATION OF DECLINE CURVE TRANSITION IN UNCONVENTIONAL RESERVOIR MODELLING

TECHNICAL FIELD

Various embodiments relate generally to oil and gas production forecasting.

BACKGROUND

Extraction of petroleum (e.g., oil) is the process by which usable petroleum is drawn out from beneath the earth's surface. The amount of oil that is recoverable is determined by a number of factors, including the permeability of the rocks, the strength of natural drives, porosity of the reservoir rock, and the viscosity of the oil. When the reservoir rocks are "tight" such as in shale, oil generally cannot flow through, but when they are permeable such as in sandstone, oil flows freely.

SUMMARY

Various apparatus and associated methods relate to computerized systems for predicting the quantity of oil and/or gas production at an oil site, where a prediction curve for oil and/or gas data transitions from a first fitted curve (e.g., a hyperbolic decline curve) to a second fitted curve (e.g., an exponential decline curve) at a transition point, the transition point being determined by progressively/iteratively identifying curvature changes in the first fitted curve over an initial time period by comparing a running list of terminal decline rates ($D_{min}$) with a predetermined curvature threshold, and setting the occurrence of the transition point at the point where the rate of change of the terminal decline rate is less than the predetermined curvature threshold. In an illustrative example, the second fitted curve may use the value of $D_{min}$ that minimizes the deviation between successive forecasts.

Some apparatus and associated methods relate to computerized systems for predicting the quantity of oil and/or gas production at an oil site, where a prediction curve for oil and/or gas data transitions from a first fitted curve (e.g., a hyperbolic decline curve) to a second fitted curve (e.g., an exponential decline curve) at a transition point, the transition point being determined by progressively/iteratively identifying curvature changes in the first fitted curve over an initial time period by comparing a running list of b exponents of a hyperbolic function ($b_{exp}$) with a predetermined curvature threshold, and setting the occurrence of the transition point at the point where the rate of change of the $b_{exp}$ is less than the predetermined curvature threshold. In an illustrative example, the second fitted curve may use the value of $b_{exp}$ that minimizes the deviation between successive forecasts.

Various embodiments may achieve one or more advantages. For example, some embodiments may identify subtle shape changes in an initial decline curve forecast, to reliably and objectively identify the point in time (or point in cumulative oil/gas production) where the oil and gas production at a given oil and gas site transitions from a first flow pattern (e.g., hyperbolic flow) to a second flow pattern (e.g., exponential flow). In some embodiments, the predetermined curvature threshold may be a user-defined value, such that a user may beneficially customize the tolerance levels when predicting the quantity of oil and/or gas production at an oil site. Various examples may minimize the error between each successive forecast, providing for increased accuracy and predictive power. Some implementations may allow for reliable forecasting of oil and gas production data without having to use empirical gas-to-oil ratio (GOR) trend data. Various methods may predict significantly less oil production compared to standard industry prediction methods, thus giving more realistic projections of production values into the future. Some implementations may perform predictions or analysis using multiple data points (e.g., a 5-day running average) for increased reliability.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
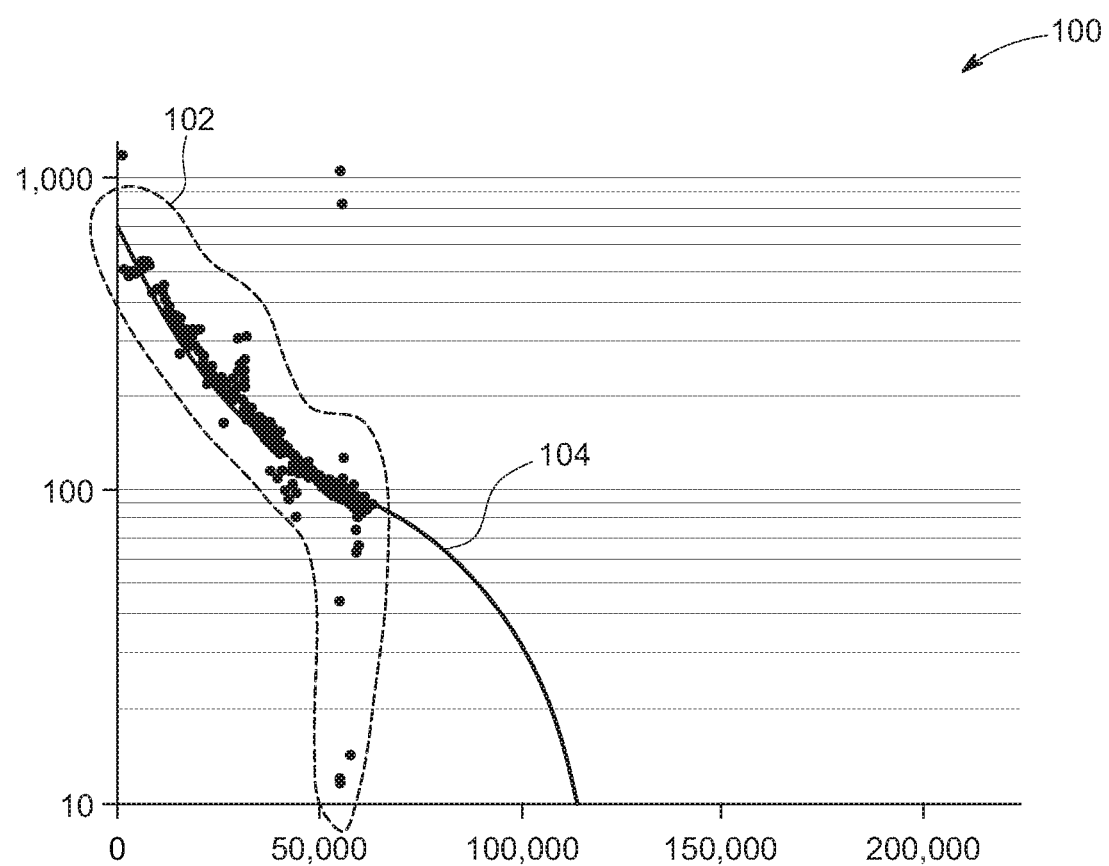
FIGS. 1, 1A, 1B, 1C, 1D, and 1E depict graphical views of exemplary decline curves to an illustrate iterative decline curve analysis method for determining a transition point from a first fitted segment to a second fitted segment.

FIGS. 1, 1A, 1B, 1C, 1D, and 1E depict graphical views of exemplary decline curves to an illustrate iterative decline curve analysis method for determining a transition point from a first fitted segment to a second fitted segment. An oil and/or gas production graph 100 includes set of empirical oil and/or gas production data points 102 represented as circles on the graph 100. Each empirical data point 102 may be daily oil/and or gas production (y-axis) vs. cumulative oil production (x-axis) for a given oil and gas well/site. In this example, daily oil/and or gas production is in units of barrels of oil per day (BOPD), while cumulative oil production is in units of cumulative barrels of oil (CUME). In some embodiments, each empirical data point 102 may be daily oil/and or gas production (in units of BOPD) vs. time (in units of days) for a given oil and gas well/site.

Fitted to the set of empirical data points 102 are oil and/or gas prediction curves 104, 104A, 104B, 104C, 104D, and 104E. An initial prediction curve 104 may be used as a "seed" to initialize an oil and/or gas prediction algorithm. Intermediate curves 104A-D are used in iterative calculations for determining the final prediction curve 104E. The initial and/or intermediate prediction curves 104, 104A-E may be formed of two fitted segments defined by two exemplary decline curve functions (e.g., a hyperbolic Arps function followed by an exponential Arps function). For example, the final prediction curve 104E may be formed of a first fitted segment 106 and a second fitted segment 108. In this sense, the curves 104, 104A-E may be regarded as a piece-wise defined functions. In this exemplary depiction, the first segment 106 is defined by a first decline curve function (e.g., a hyperbolic Arps function), while the second segment 108 is defined by a second decline curve function (e.g., an exponential Arps function).

The first segment 106 transitions to the second segment 108 at an optimally determined transition point T. The transition point T may be determined by iteratively comparing a difference between successive decline rates of the intermediate curves 104A-104D to a predetermined minimum decline rate threshold. By progressively and iteratively identifying curvature changes in the empirical data 102 over an initial time period, various computer implemented oil and/or gas prediction processes disclosed herein may reliably and objectively identify the point in time (or point in cumulative oil/gas production) where an oil and/or gas production at a given oil and gas site transitions from a first decline curve function (e.g., hyperbolic Arps function) to a second decline curve function (e.g., exponential Arps function).

Figure 1A:
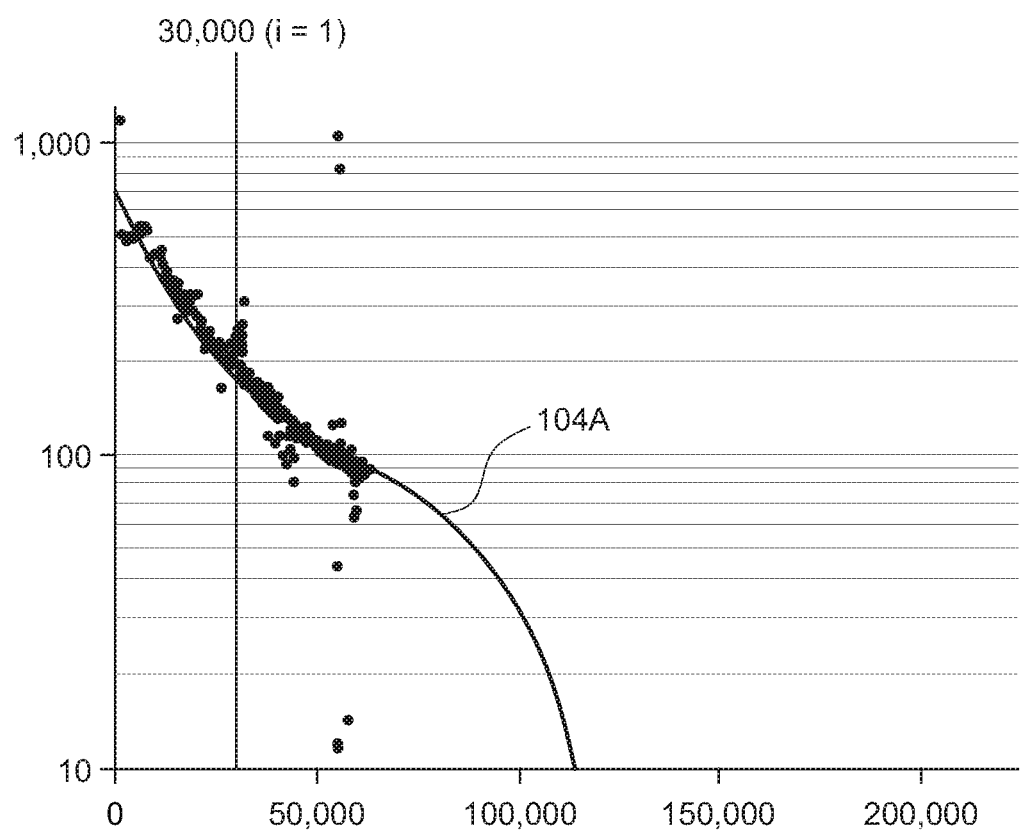

As shown in the exemplary depiction of FIG. 1, an exemplary computer implemented process first fits a curve 104 to the empirical data 102. The curve 104 may have a terminal decline rate, in some implementations. Next, the process the process picks a first x-axis value $X_1$ (in this case, 30,000 CUME, as shown in FIG. 1A). Next, the process computationally optimizes the terminal decline rate of the curve 104 to achieve a predicted production value that matches the actual/empirical production at the first x-axis value. This will generate a new curve 104A having a first decline rate $R_1$ optimized such that the predicted production by curve 104A at the first x-axis value matches the actual production at the first x-axis value. In the depicted example, the actual production at 30,000 CUME is 250 BOPD. Therefore, the process optimizingly determines that a (first) terminal decline rate of $R_1$=63.2% is required for the curve 104A to have a prediction production at CUME 30,000 that matches the actual production of 250 BOPD.

Figure 1B:
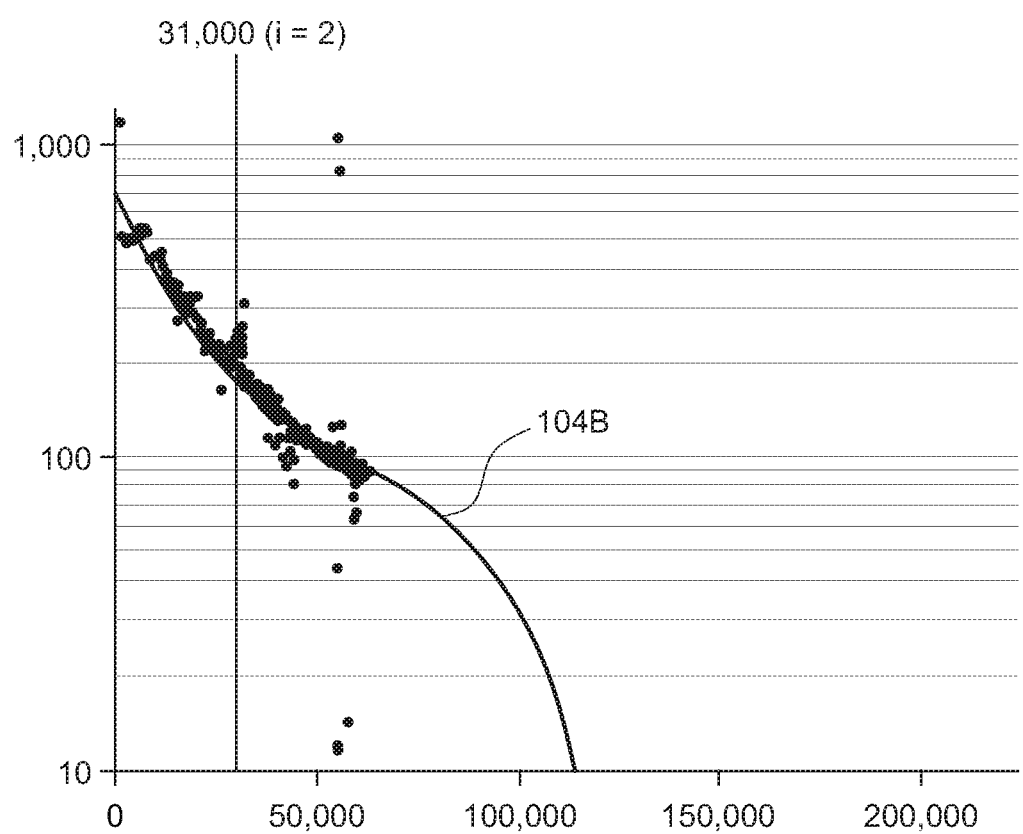
Figure 1C:
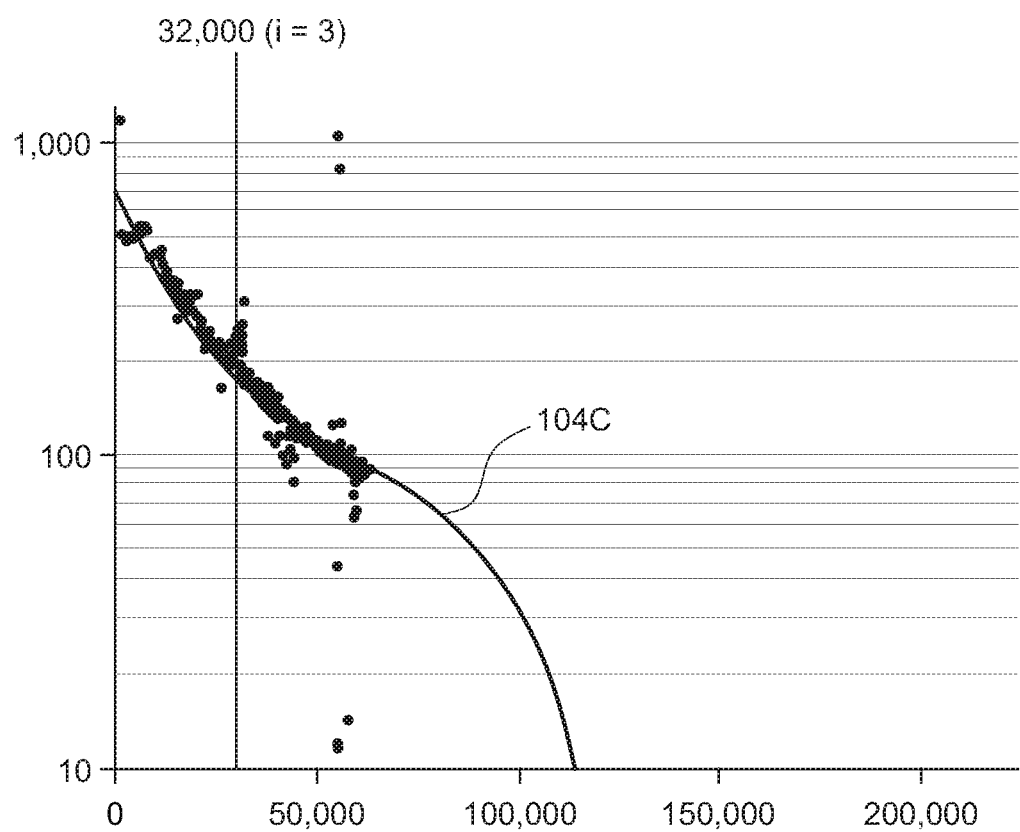

Next, the process will iterate to a next/second x-axis value $X_2$ (in this case, 31,000 CUME, as shown in FIG. 1B). The process will then computationally optimize the terminal decline rate of the curve 104 (or 104A) to achieve a predicted production value that matches the actual/empirical production at the second x-axis value. This will generate a new curve 104B having a second decline rate $R_2$ optimized such that the predicted production by curve 104B at the second x-axis value matches the actual production at the second x-axis value. In the depicted example, the actual production at 31,000 CUME is 235 BOPD. Therefore, the process optimizingly determines that a (second) terminal decline rate of $R_2$=61.0% is required for the curve 104B to have a prediction production at CUME 31,000 that matches the actual production of 235 BOPD.

At this point, the process will then take a difference $\Delta_1$ between the first decline rate $R_1$ and the second decline rate $R_1$ ($\Delta_1=R_2-R_1$), and compare this difference to a predetermined decline curvature threshold $D_{thresh}$. In this case, $\Delta_1=R_2-R_1=63.2\%-61.0\%=2.2\%$. Therefore, assuming a $D_{thresh}$ of 0.2%, $\Delta_1=2.2\%>0.2\%=D_{thresh}$. Because $\Delta_1>D_{thresh}$, the process continues/iterates to a next/third x-axis value $X_3$.

In this example, a next/third x-axis value $X_3$=32,000 CUME, as shown in FIG. 1B). Similar to above, the process computationally optimizes the terminal decline rate of the curve 104 (or 104A-104B) to achieve a predicted production value that matches the actual/empirical production at the third x-axis value. This will generate a new curve 104C having a third decline rate $R_3$ optimized such that the predicted production by curve 104C at the third x-axis value matches the actual production at the third x-axis value. In the depicted example, the actual production at 32,000 CUME is 242 BOPD. Therefore, the process optimizingly determines that a (second) terminal decline rate of $R_2$=59.0% is required for the curve 104C to have a prediction production at CUME 32,000 that matches the actual production of 242 BOPD.

At this point, and similar to above, the process will then take a difference $\Delta_2$ between the second decline rate $R_2$ and the third decline rate $R_3$ ($\Delta_2=R_3-R_2$), and compare this difference to the predetermined decline curvature threshold $D_{thresh}$. In this case, $\Delta_2=R_3-R_2=61.0\%-59.0\%=2.0\%$. Therefore, $\Delta_2=2.0\%>0.2\%=D_{thresh}$. Because $\Delta_2>D_{thresh}$, the process continues/iterates to a next/fourth x-axis value $X_4$ (not shown).

Figure 1D:
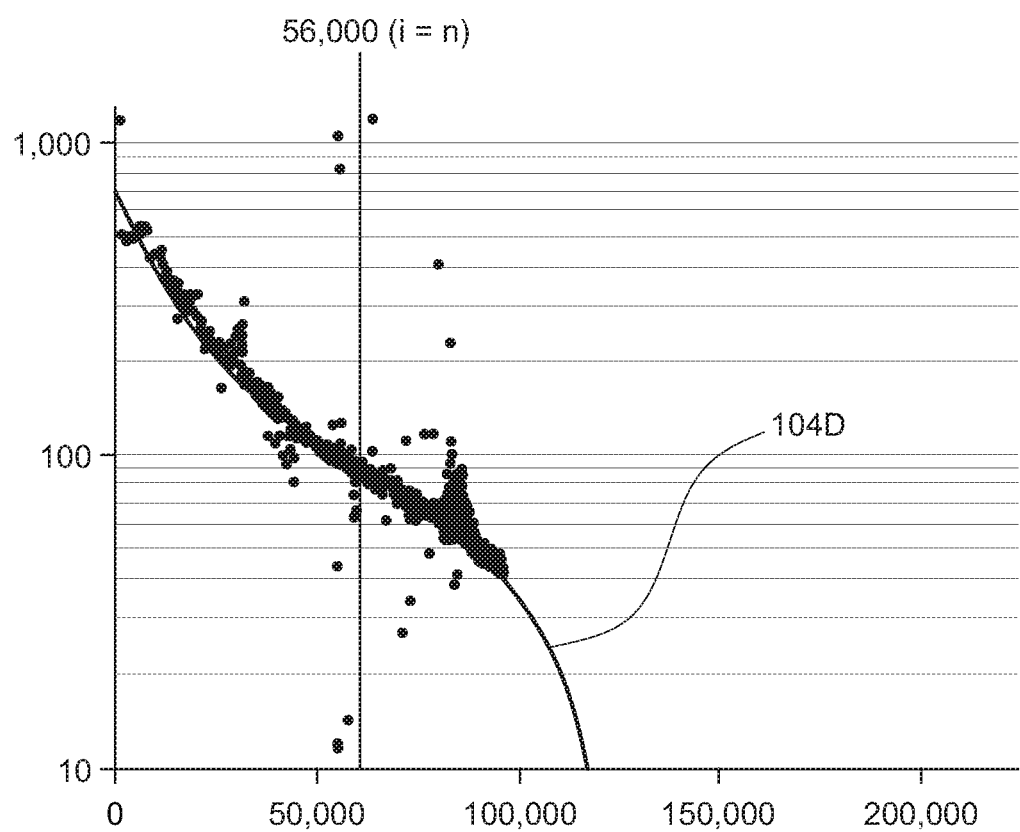

The above process will iterate/loop through each successive pair of curves and associated terminal decline rates, until $\Delta_n<D_{thresh}$. In this illustrative example, an $n^{th}$ x-axis value $X_n$=56,000 CUME is associated with an actual production value of 95 BOPD, as shown in FIG. 1D. Similar to above, the process previously determined that an nth terminal decline rate of $R_n$=42.9% is required for a curve 104D to have a prediction production at CUME 56,000 that matches the actual production of 95 BOPD.

Figure 1E:
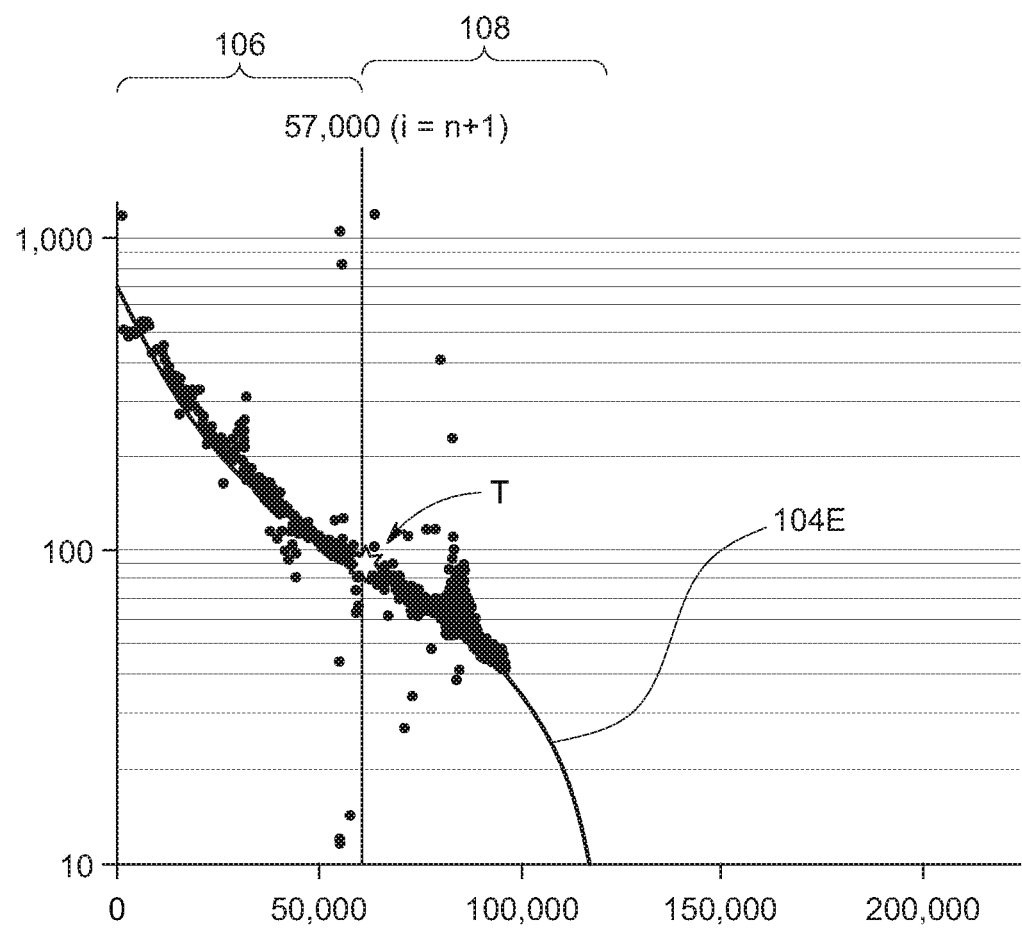

An $(n+1)^{th}$ x-axis value $X_{n+1}$=57,000 CUME is associated with an actual production value of 91 BOPD, as shown in FIG. 1E. Also similar to above, the process previously determined that an $(n+1)^{th}$ terminal decline rate of $R_{n+1}$=42.8% is required for a curve 104E to have a prediction production at CUME 57,000 that matches the actual production of 91 BOPD.

At this point, and similar to above, the process will then take a difference $\Delta_n$ between the nth decline rate $R_n$ and the $(n+1)^{th}$ decline rate $R_{n+1}$ ($\Delta_n=R_n-R_{n+1}$), and compare this difference to the predetermined decline curvature threshold $D_{thresh}$. In this case, $\Delta_n=R\eta-R_{n+1}=42.9\%-42.8\%=0.1\%$. Therefore, $\Delta_n=0.1\%<0.2\%=D_{thresh}$. Because $\Delta_2<D_{thresh}$, the process determines that the nth fitted curve 104E is the final fitted curve that transitions from the first fitted segment 106 to the second fitted segment 108 at transition point T having an x-axis value equal to $X_n$. A computer-implemented method that uses the predetermined threshold as a decline curvature condition for a transition from a first fitted segment to a second segment may advantageously yield more accurate and realistic predictions of oil and/or gas production for a given oil and gas site (as detailed in FIGS. 3A-3C, for example).

In some implementations, the process my use multiple data points (both predicted and empirical) for determining a terminal decline rate $R_k$. For example, the process may take a 30-day moving average of predicted data points (e.g., as predicted in any of the curves 104, 104A-E), and compare it to an associated 30-day moving average of empirical data points (e.g., a subset of data points 102). A moving average approach may advantageously "smooth" out the empirical data, and consequently, "smoothen" out the differences $\Delta_k$'s.

In a preferred embodiment, the first segment 106 may be characterized by a hyperbolic function according to the hyperbolic Arps Equation:

$$q = q_0(1+bD_it)^{-\frac{1}{b}},$$

while the second segment 108 may be characterized by an exponential function according to the exponential Arps Equation (with the parameter b set to zero):

$$q=q_0e^{-tD_i}$$

The exponential form of the Arps Equation generally possesses a steeper decline versus the hyperbolic form for the same values of $q_0$ and $D_i$. The effective decline rate (D) is a constant only for an exponential decline. In contrast, the effective decline rate decreases with time for a hyperbolic decline. In an exemplary case where the first segment 106 is a hyperbolic Arps function and the second segment an exponential Arps function, the exponential decline rate of the exponential Arps function may be equal to the terminal decline rate of the hyperbolic Arps function. In such applications, a combined fitted curve (e.g., curve 104E) may advantageously yield more conservative estimates for oil and gas production sites (particularly in late-stage wells) that are more in line with actual/empirical production data.

Figure 2:
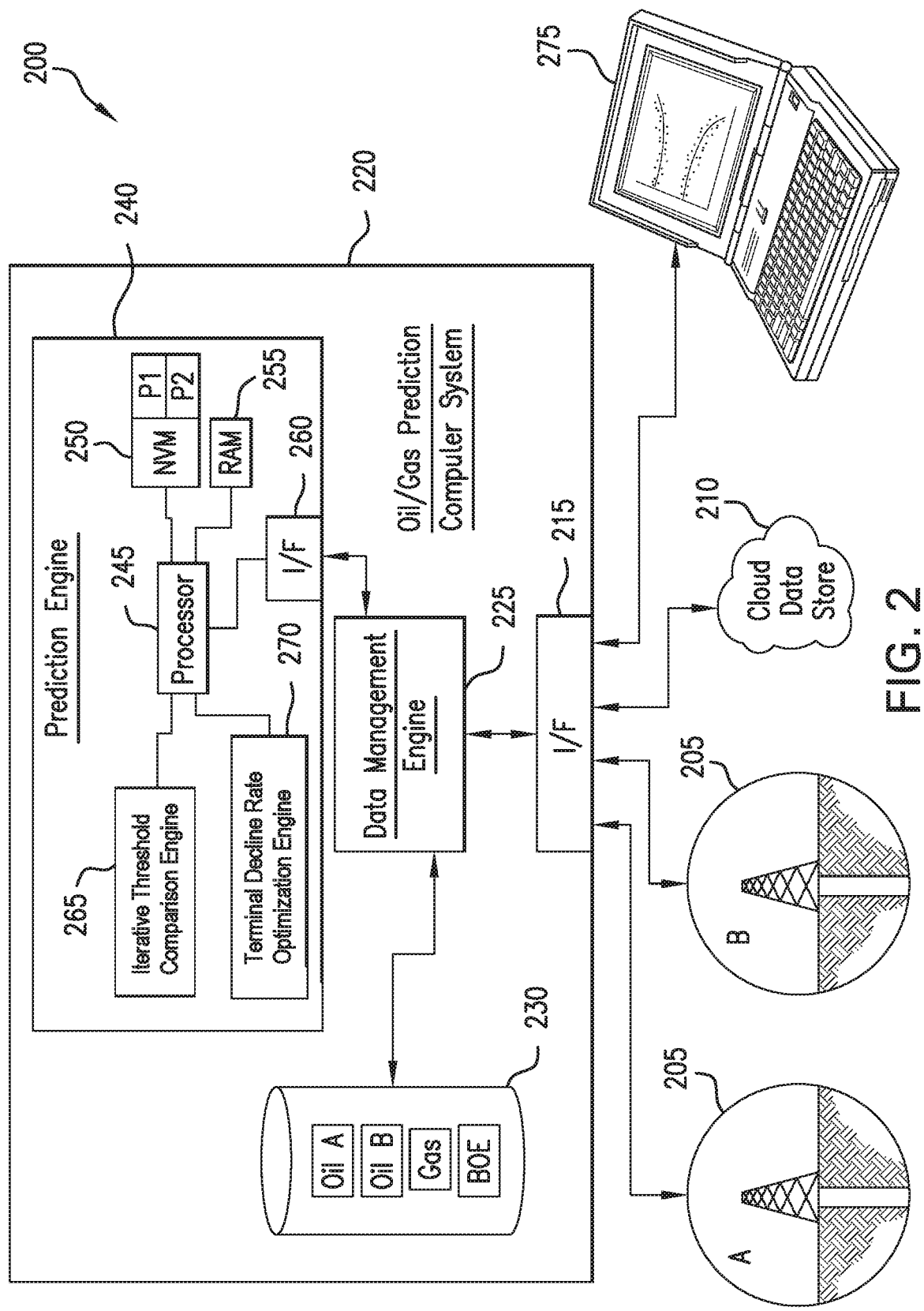
FIG. 2 depicts a diagrammatic view of an exemplary computer system configured to generate prediction curves using iterative curvature analysis.

FIG. 2 depicts a diagrammatic view of an exemplary computer system configured to generate prediction curves using iterative curvature analysis. A prediction system 200 uses oil and/or gas production data from a producing wellbore. For example, the data used by the prediction system 200 may come directly from sensors or monitors at wells 205. The data used by the prediction system 200 may also come from a cloud data storage 210, which may have a compilation of data pertaining to oil and gas production. The data from the wells 205 and cloud data storage 210 may be transmitted to an interface 215 of an oil and point computer prediction system 220.

The interface 215 communicates data and information to and from a data management engine 225, which controls the flow of data and information within the prediction system 220. The data management engine 225 is configured to send data to/receive data from an oil and gas database 230 and a prediction engine 240. The oil and gas database 230 stores historical and/or real-time data about oil and gas production from, for example, oil wells 205. The prediction engine 240 uses the data in the databases to make predictions and using iterative decline threshold analysis algorithms.

The prediction engine 240 includes at least one processor 245, non-volatile memory (NVM) 250, random-access memory 255, and an interface 260. The interface 260 transmits data to, and receives data from, the data management engine 225. The interface 260 communicates with the processor 245, which executes various one or more preprogrammed sets of instructions that may be stored in a data store. In the depicted example, the data store is illustrated as the nonvolatile memory 250 (e.g., P1 and P2). The processor 245 also is operably connected and configured to employ the random-access memory (RAM) 255. The programs stored in the nonvolatile memory 250 may include pre-programmed implementations of the methods described within this disclosure (such as the method 400 in FIG. 4, for example), and may also include a set of pre-programmed instructions for rendering and displaying various analytical tools (such as, for example, graphs, charts, statistical summaries, and data visualizations). The prediction engine 240 may also include specialized (sub-)engines, such as an iterative threshold comparison engine 265 and a terminal decline rate optimization engine 270, all of which may be stored as pre-programmed instructions in nonvolatile memory 250. The iterative comparison engine 265 may be configured to implement various steps in the iterative decline curve analysis methods disclosed in FIG. 4, in at least some implementations.

When the processor 245 executes the set of pre-programmed instructions stored in nonvolatile memory 250 (and the set of pre-programmed instructions in the engines 265 and 270), it communicates this information to the interface 260, which relays the information back to the data management engine 225. The interface 215 then takes this information relayed to the data management engine 225 and communicates it to a user interface 275. The user interface 275 can display the various analytical tools to a user (e.g., decline curve analysis tools). The user interface 275 can also receive input from a user, which can be translated into instructions for the processor 245 to implement (by sending it through the interfaces 215 and 260).

Figure 3A:
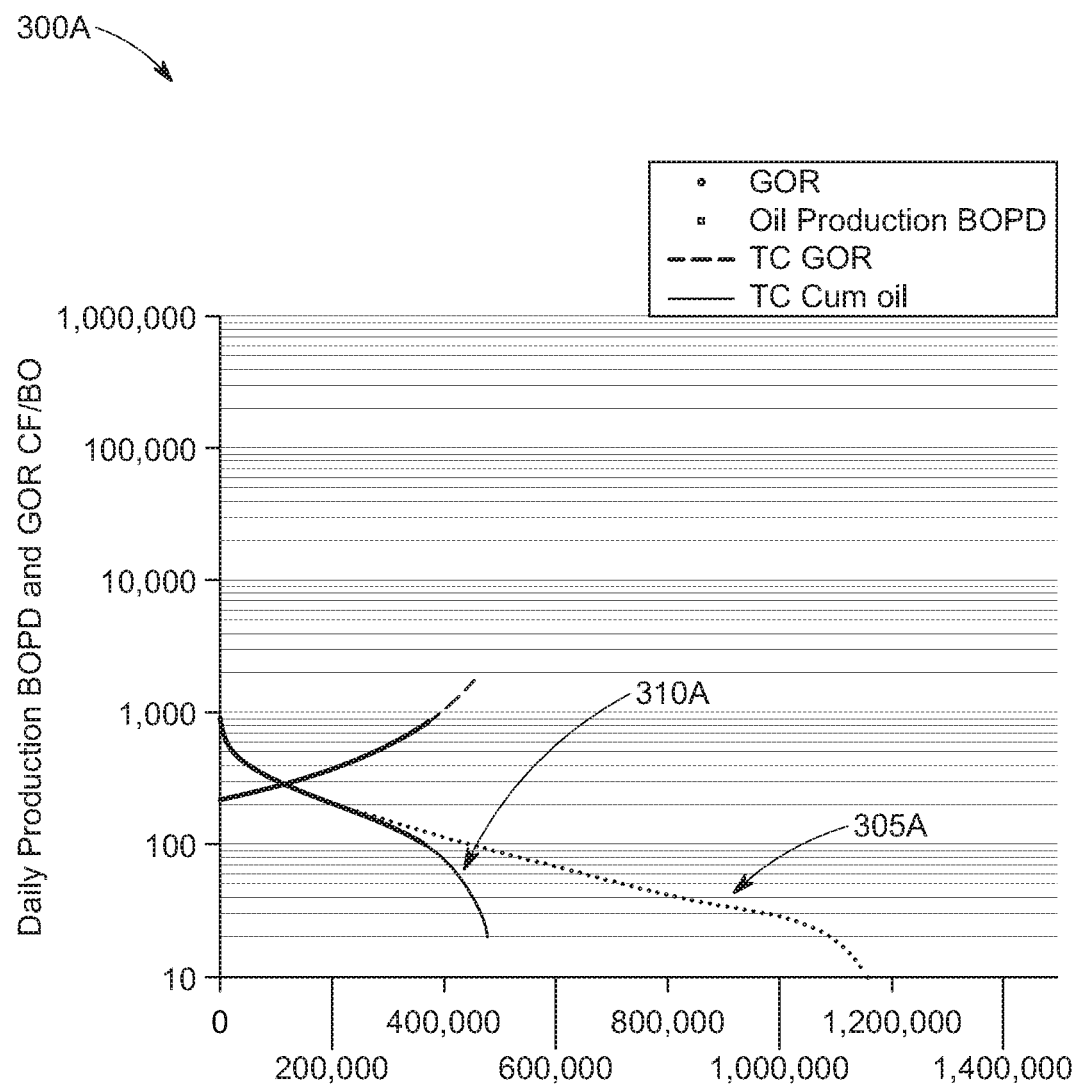
FIGS. 3A-3C depicts graphical views of exemplary decline curves illustrating iterative curvature analysis with different data sets associated with different oil and gas production sites (e.g., oil wells).
Figure 3B:
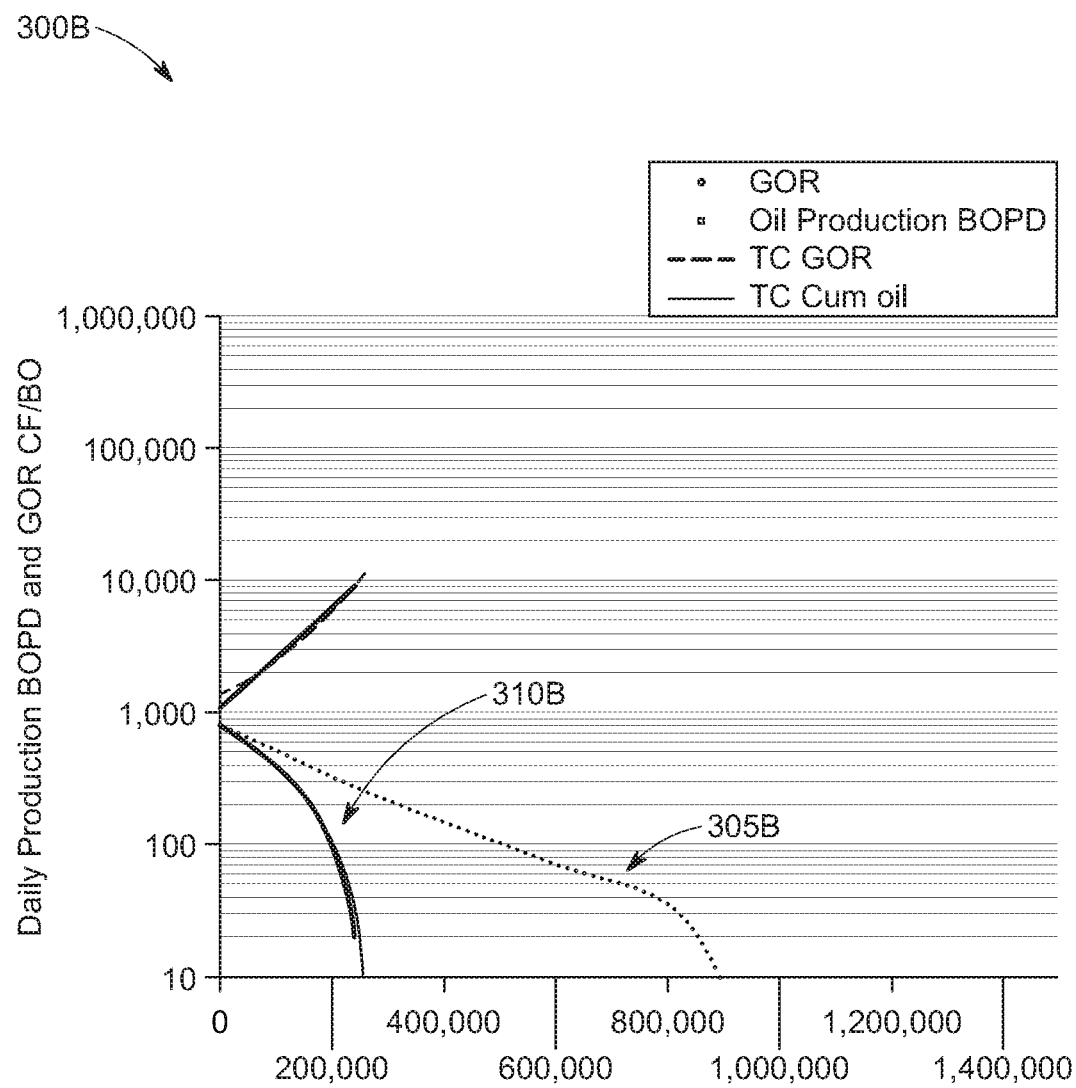
Figure 3C:
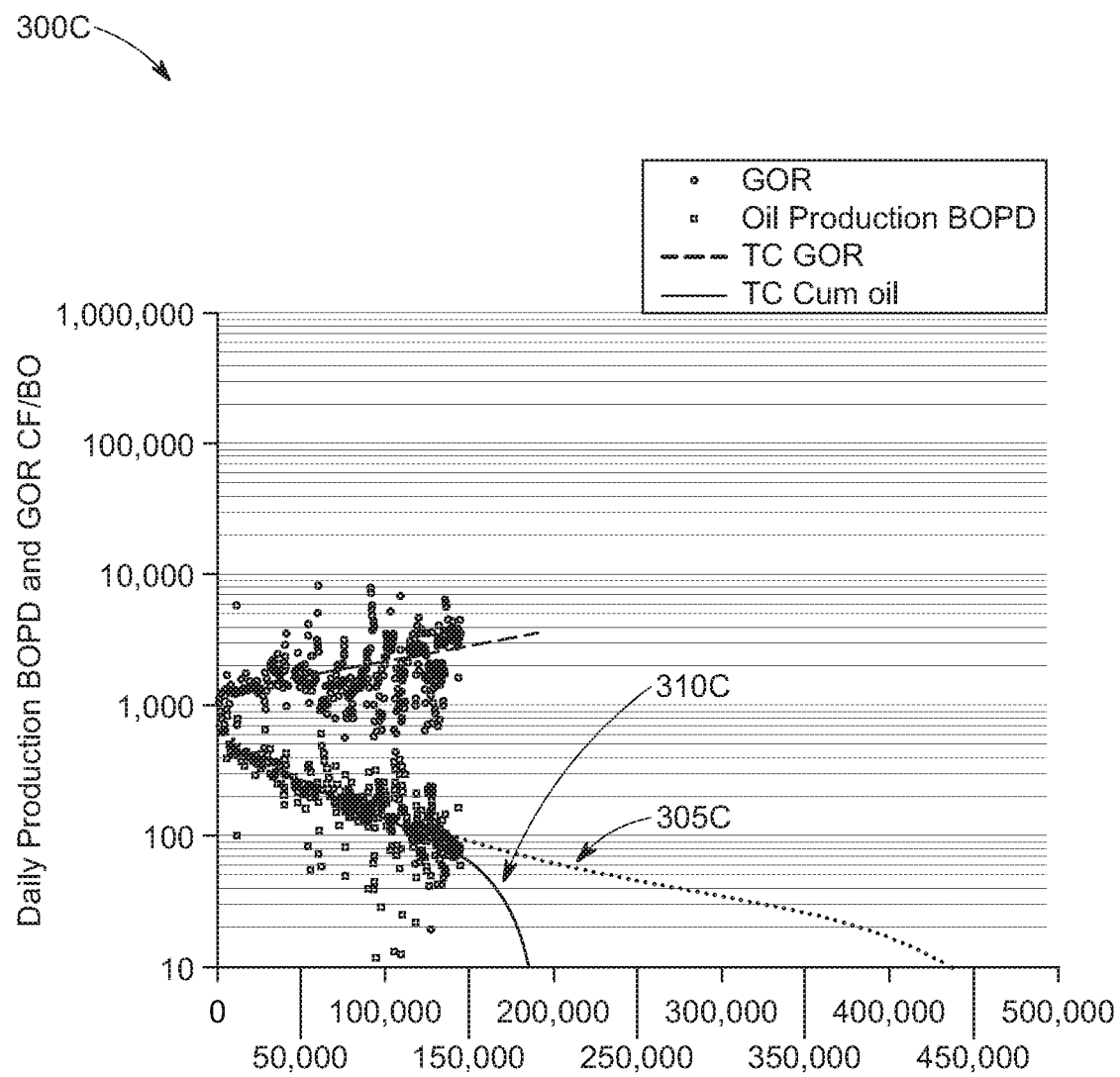

FIGS. 3A-3C depicts graphical views of exemplary decline curves illustrating iterative curvature analysis with different data sets associated with different oil and gas production sites (e.g., oil wells). The exemplary oil and gas production data and curves shown in FIGS. 3A-3C represent three separate "case studies" that illustrate the benefit of the decline curve analysis methods disclosed herein. Using these graphs as visualizations to compare the improved predicted recovery of methods disclosed herein against "traditional" predicted recoveries, it is readily apparent that the improved prediction methods disclosed herein may yield more accurate and realistic predictions (vs. "traditional" prediction methods that may tend to overestimate the amount of oil and/or gas produced by a given well or site).

For example, a graph 300A depicted in FIG. 3A shows a "traditional" decline curve 305A and an "improved" decline curve 310A in accordance with methods disclosed herein (e.g., such as the method illustrated in FIG. 4, discussed further below). The graph 300A uses real-world empirical data for an oil and gas site located in the Bakken Play of North Dakota. The traditional curve 305A may be based on a current industry forecast that assumes a terminal exponential decline rate of 7%, for example. As shown, the traditional curve 305A predicts an ultimate recovery of a little less than 1,200,000 barrels of oil. In contrast, an improved curve 310A predicts much less oil production—closer to 500,000 barrels of oil—which may be in better agreement with the actual empirical data. Accordingly, the improved curve 310A may advantageously make more accurate and realistic predictions for oil and gas production using a given set of empirical oil and gas production data.

The graph 300B depicted in FIG. 3B again shows a "traditional" decline curve 305B and an "improved" decline curve 310B in accordance with methods disclosed herein (e.g., such as the method illustrated in FIG. 4, discussed further below). The graph 300B uses real-world empirical data for an oil and gas site located in the Bakken Play of North Dakota. The traditional curve 305A may be based on a current industry forecast that assumes a terminal exponential decline rate of 7%, for example. As shown, the traditional curve 305B predicts an ultimate recovery of around 900,000 barrels of oil. In contrast, an improved curve 310A predicts much less oil production—closer to 250,000 barrels of oil—which may be in better agreement with the actual empirical data. Accordingly, the improved curve 310B may advantageously make more accurate and realistic predictions for oil and gas production using a given set of empirical oil and gas production data.

A graph 300C depicted in FIG. 3C shows a "traditional" decline curve 305C and an "improved" decline curve 310C in accordance with methods disclosed herein (e.g., such as the method illustrated in FIG. 4, discussed further below). The graph 300C uses real-world empirical data for an oil and gas site located at the Oklahoma SCOOP/STACK. The traditional curve 305C may be based on a current industry forecast that assumes a terminal exponential decline rate of 7%, for example. As shown, the traditional curve 305C predicts an ultimate recovery of a little less than 450,000 barrels of oil. In contrast, an improved curve 310C predicts much less oil production—closer to 175,000 barrels of oil—which may be in better agreement with the actual empirical data. Accordingly, the improved curve 310C may advantageously make more accurate and realistic predictions for oil and gas production using a given set of empirical oil and gas production data.

Figure 4:
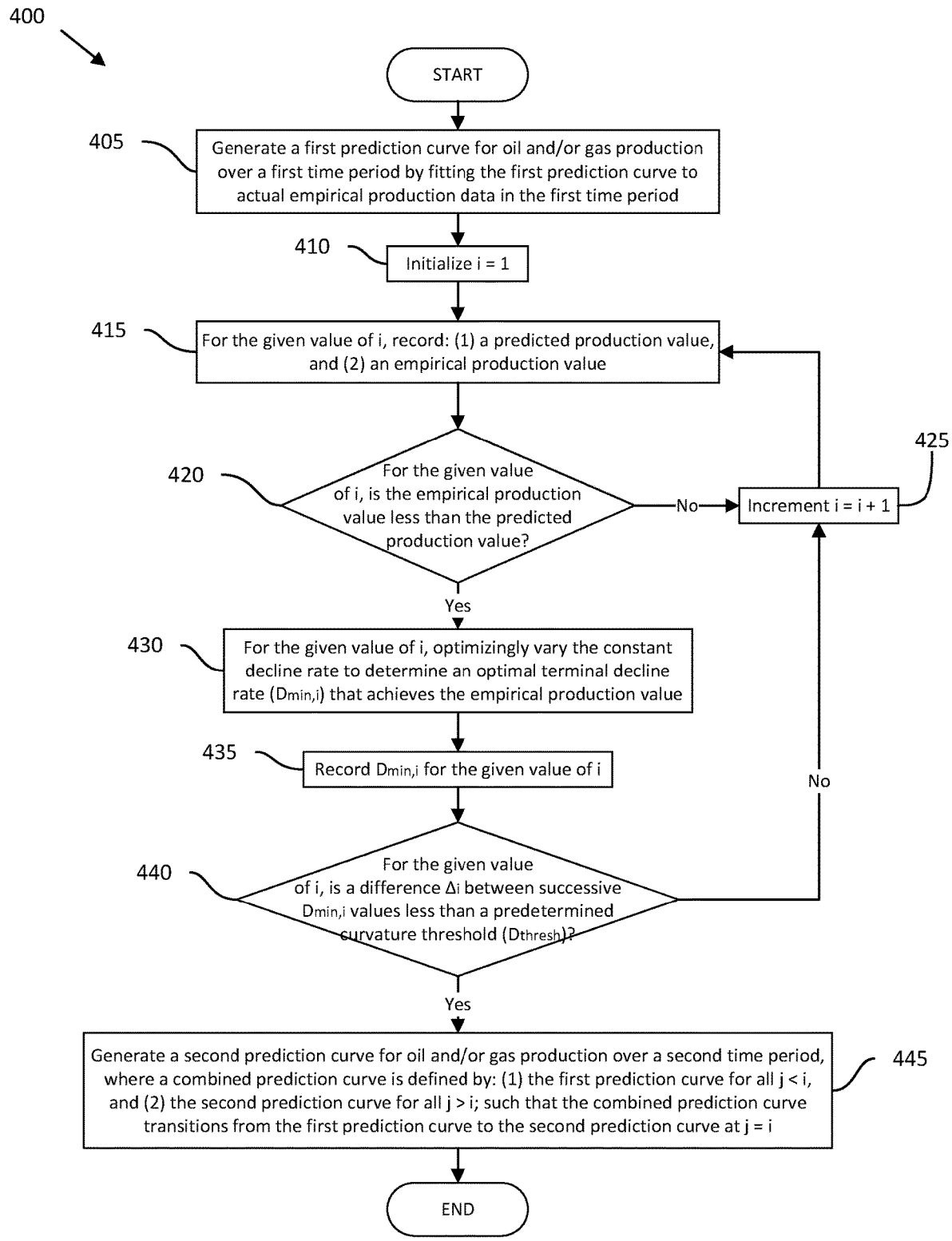
FIG. 4 depicts a flowchart of an exemplary decline curve generation method to predict oil and/or gas production at an oil and/or gas production site, the method utilizing iterative curvature analysis to determine a transition point between a first monotonically decreasing function and second monotonically decreasing function.

FIG. 4 depicts a flowchart of an exemplary decline curve generation method to predict oil and/or gas production at an oil and/or gas production site, the method utilizing iterative curvature analysis to determine a transition point between a first monotonically decreasing function and second monotonically decreasing function. A computer-implemented process 400 starts at step 405 with the process generating a first prediction curve over a first time period. The first prediction curve may be a hyperbolic curve with a variable decline rate, in some embodiments. The first prediction curve is constructed by fitting to actual empirical production data during the first time period. Next, at step 410 the process initializes a loop counter i to i=1. The loop counter at i=1 may represent a specific x-axis point (e.g., time or CUME) where the iterative process begins (see, e.g., FIG. 1A). Next, at step 415 the process records a predicted production value (in accordance with the first prediction curve) and an empirical production value. Next, at step 420 the process compares the predicted value to the empirical value. If the empirical value is not less than the predicted value, then the process continues to step 425 where the loop counter i is incremented to i=i+1, and then the process resumes at step 415. If the empirical value is less than the predicted value, then the process continues to step 430.

At step 430, the process optimizingly varies the terminal decline rate to determine an optimal terminal decline rate $D_{min,i}$, such that the prediction curve achieves a predicted value that achieves/matches the empirical production value for that value of i (e.g., such that the predicted BOPD on a specific day is equal to an empirical BOPD on that same day). Next, at step 435, the process records the determined rate $D_{min,i}$. Next, at step 440, the process compares a difference between successive values of $D_{min,i}$ to a predetermined curvature threshold $D_{thresh}$. If the difference $\Delta_i = D_{min,i} - D_{min,i-1}$ is greater than the predetermined threshold $D_{thresh}$, then the process continues to step 425 where the loop counter i is incremented to i=i+1, and then the process resumes at step 415. Note that for i=1, step 440 may be skipped and the process may go directly to step 425 (as there is no difference $\Delta_0$ since only one value of $D_{min,i}$ has been determined at i=1). If at step 440, the difference $\Delta_i = D_{min,i} - D_{min,i-1}$ is less than the predetermined threshold $D_{thresh}$, then the process continues to step 445.

At step 445, the process generates a final/combined prediction curve that includes the first prediction curve (having a $D_{min}$ value of $D_{min,i}$ for the current value of i), and a second prediction curve. The first prediction curve transitions to the second prediction curve at transition point T occurring at the current value of i (which may be associated with a specific date/time and/or CUME production value). Therefore, the final/combined fitted curve may be piece-wise defined by the first prediction curve for all j<i, and the second prediction curve for all j>i.

In various implementations, the steps 415-430 may use moving average values as inputs, as opposed to predicted/empirical values on a single specific day/CUME value. For example, the process may use a predicted M-day moving average of predicted production values, and compare this predicted M-day moving average to an associated empirical M-day moving average. The number M may, for example, be about 2 days, 5 days, 7 days, 10 days, 20 days, 30 days, 60 days, or about 90 days or more. A moving average approach may advantageously "smooth" out the empirical data, and consequently, "smoothen" out the differences $\Delta k$'s. The parameter M may be a user-defined parameter, in some embodiments, such that the user may advantageously adjust a moving average window size to fit the specific application.

In various implementations, the threshold $D_{thresh}$ may be a user-defined value. For example, a user may pre-set $D_{thresh}$ to be about 0.1%, 0.5%, 1%, 2%, 3%, 5%, or about 10% or more. By using a user-defined tolerance for $D_{thresh}$, the process 400 may advantageously allow a user to "tighten" or "loosen" the decline curve transition point conditions to suit a wide range of empirical data scenarios.

In some examples, an additional step may be performed that requires the difference $\Delta_i$ to be less than the threshold $D_{thresh}$ for a predetermined number of iterations before going to step 445. For example, a (user) pre-defined value of $i_{thresh}$ may be an additional conditional comparison, such that after step 440, the process 400 determines for how many iterations the differences $\Delta_i$ is less than the threshold $D_{thresh}$. Once the process 400 has looped through step 440 a user-predetermined $b_x$ number of times determining that the differences $\Delta_i$ is less than the threshold $D_{thresh}$, the process may then finally transition to step 445, in at least some implementations. In various examples, the value $i_{thresh}$ may be about 2, 3, 5, 10, or about 20.

In various examples, the value of $D_{min}$ may be reset every time the process 400 loops through step 425. For example, at each step 415, the process 400 may reset the $D_{min}$ value of the first prediction curve to a (user) predetermined "de minimis" terminal decline rate. In various examples, the de minimis decline rate may be about 0.1%, 0.2%, 0.5%, 1%, 1.5%, 2%, or about 5%. In various embodiments, the $D_{min}$ may advantageously be reset to a de minimis value range, for example. By continually resetting the value of $D_{min}$, the process 400 may substantially ensure that the first prediction curve exhibits a variable rate decline, in the case of a hyperbolic variable decline determined by a hyperbolic Arps function.

Figure 5:
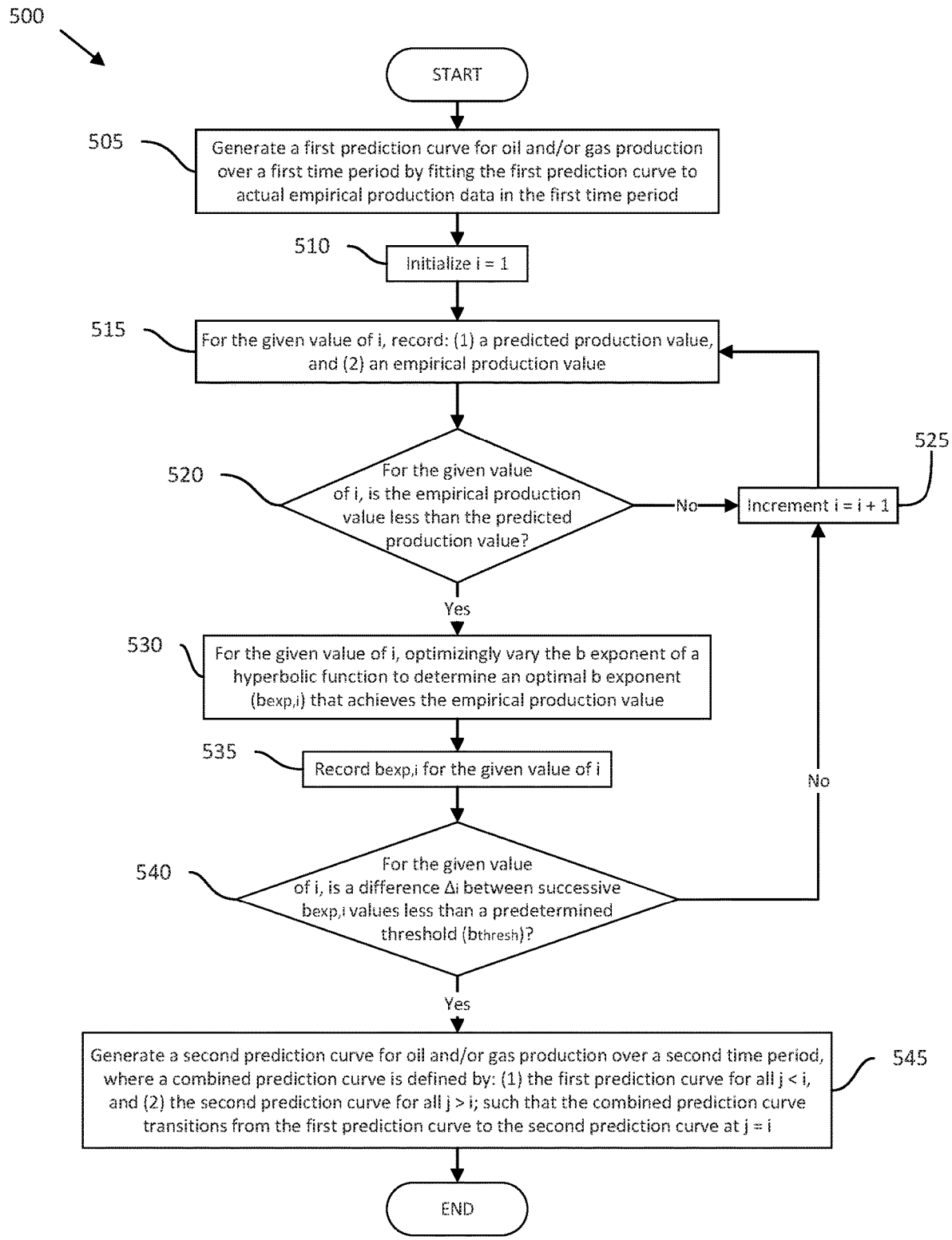
FIG. 5 depicts a flowchart of another exemplary decline curve generation method to predict oil and/or gas production at an oil and/or gas production site, the method utilizing iterative curvature analysis to determine a transition point between a first monotonically decreasing function and second monotonically decreasing function.

FIG. 5 depicts a flowchart of another exemplary decline curve generation method to predict oil and/or gas production at an oil and/or gas production site, the method utilizing iterative curvature analysis to determine a transition point between a first monotonically decreasing function and second monotonically decreasing function.

A computer-implemented process 500 starts at step 505 with the process generating a first prediction curve over a first time period. The first prediction curve may be a hyperbolic curve with a variable decline rate, in some embodiments. The first prediction curve is constructed by fitting to actual empirical production data during the first time period. Next, at step 510 the process initializes a loop counter i to i=1. The loop counter at i=1 may represent a specific x-axis point (e.g., time or CUME) where the iterative process begins (see, e.g., FIG. 1A). Next, at step 515 the process records a predicted production value (in accordance with the first prediction curve) and an empirical production value. Next, at step 520 the process compares the predicted value to the empirical value. If the empirical value is not less than the predicted value, then the process continues to step 525 where the loop counter i is incremented to i=i+1, and then the process resumes at step 515. If the empirical value is less than the predicted value, then the process continues to step 530.

At step 530, the process optimizingly varies the b exponent of a hyperbolic function to determine an optimal b exponent ($b_{exp,i}$), such that the prediction curve achieves a predicted value that achieves/matches the empirical production value for that value of i (e.g., such that the predicted BOPD on a specific day is equal to an empirical BOPD on that same day). Next, at step 535, the process records the determined parameter value $b_{exp,i}$. Next, at step 540, the process compares a difference between successive values of $b_{exp,i}$ to a predetermined b exponent threshold $b_{thresh}$. If the difference $\Delta_i = b_{exp,i} - b_{exp,i-1}$ is greater than the predetermined threshold $D_{thresh}$, then the process continues to step 525 where the loop counter i is incremented to i=i+1, and then the process resumes at step 515. Note that for i=1, step 540 may be skipped and the process may go directly to step 525 (as there is no difference $\Delta_0$ since only one value of $b_{exp,i}$ has been determined at i=1). If at step 540, the difference $\Delta_i = b_{exp,i} - b_{exp,i-1}$ is less than the predetermined threshold $b_{thresh}$, then the process continues to step 545.

At step 545, the process generates a final/combined prediction curve that includes the first prediction curve (having a $b_{exp}$ value of $b_{exp,i}$ for the current value of i), and a second prediction curve. The first prediction curve transitions to the second prediction curve at transition point T occurring at the current value of i (which may be, for example, associated with a specific date/time and/or CUME production value). Therefore, the final/combined fitted curve may be piecewise defined by the first prediction curve for all j<i, and the second prediction curve for all j>i.

In various implementations, the steps 515-530 may use moving average values as inputs, as opposed to predicted/empirical values on a single specific day/CUME value. For example, the process may use a predicted M-day moving average of predicted production values, and compare this predicted M-day moving average to an associated empirical M-day moving average. The number M may, for example, be about 2 days, 5 days, 7 days, 10 days, 20 days, 30 days, 60 days, or about 90 days or more. A moving average approach may advantageously "smooth" out the empirical data, and consequently, "smoothen" out the differences $\Delta_k$'s. The parameter M may be a user-defined parameter, in some embodiments, such that the user may advantageously adjust a moving average window size to fit the specific application.

In various implementations, the threshold $b_{thresh}$ may be a user-defined value. For example, a user may pre-set $b_{thresh}$ to be about 0.1%, 0.5%, 1%, 2%, 3%, 5%, or about 10% or more. By using a user-defined tolerance for $b_{thresh}$, the process 500 may advantageously allow a user to "tighten" or "loosen" the decline curve transition point conditions to suit a wide range of empirical data scenarios.

In some examples, an additional step may be performed that requires the difference $\Delta_i$ to be less than the threshold $b_{thresh}$ for a predetermined number of iterations before going to step 545. For example, a (user) pre-defined value of $i_{thresh}$ may be an additional conditional comparison, such that after step 540, the process 500 determines for how many iterations the differences $\Delta_i$ is less than the threshold $b_{thresh}$. Once the process 500 has looped through step 540 a user-predetermined $b_x$ number of times determining that the differences $\Delta_i$ is less than the threshold $b_{thresh}$, the process may then finally transition to step 545, in at least some implementations. In various examples, the value $i_{thresh}$ may be about 2, 3, 5, 10, or about 20.

Although various embodiments have been described with reference to the Figures, other embodiments are possible. For example, although hyperbolic and exponential Arps functions may be used in some embodiments, in various implementations, other types of decline curves/functions may be used. In at least one implementation, a process may use a Duong decline curve as a first or a second predicted curve. In various examples, the phrase "terminal exponential decline rate" may be referred to as a "constant-rate decline rate." In various implementations, the phrase "decline curvature threshold" may be referred to as a "decline constancy threshold."

With reference to FIG. 4, for example, and in various implementations, $D_{thresh}$ may be the minimum difference between each Drain as determined in each loop. Each successive $D_{min}$ required to match the new production data may be archived and the difference between each successive $D_{min}$ may be calculated to determine when $D_{min}$ substantially settles approximately onto a single value, which may indicate or mark the transition to the second function and may be used to generate the second forecast. $B_{thresh}$ may operate in substantially like manner, for example, with respect to the $b_{exp}$ described with reference, for example, to FIG. 5. In some examples, some embodiments may add new data and determine the new $D_{min}$ and/or $b_{exp}$ to match the new data. The transition may be declared "made" when the user-defined $D_{thresh}$ or $b_{thresh}$, (the difference between consecutive runs) stabilizes. Stabilization may be defined, for example, by the $D_{thresh}$ or $B_{thresh}$.

Although some embodiments may be described in terms of production output as a function of time (e.g., days), other functional relationships are possible. For example, some implementations may be understood in terms of production output as a function of cumulative output metrics (e.g., CUME).

In one exemplary aspect, a method may include, if the empirical production value is less than the predicted production value ($Y_{emp,i} < Y_{pred,i}$), then iteratively determining updated parameters of a first monotonically decreasing function to generate a second monotonically decreasing function that matches the empirical production value. Then, the method may include iteratively comparing: (1) a difference between successive parameters (e.g., $D_{min}$, $b_{exp}$), with (2) a predetermined constancy threshold ($D_{thresh}$, $b_{thresh}$), to iteratively determine whether the difference between successive parameter values is less than the predetermined constancy threshold. If the difference between successive parameter values ($\Delta_i$, e.g., $\Delta_i = D_{min,i} - D_{min,i-1}$, $\Delta_i = b_{exp,i} - b_{exp,i-1}$) is less than the predetermined constancy threshold ($\Delta_i < D_{thresh}$, $\Delta_i < b_{thresh}$), determining a transition point (T) where the difference between successive parameter values ($\Delta_i$) is less than the predetermined constancy threshold.

In some implementations, the iterative comparison method may include a hybrid comparison comprising a function of more than one parameter. For example, the iterative method may include optimizingly varying both the constant decline rate $D_{min}$ and the b exponent $b_{exp}$. In some embodiments, each iteration may include a search to simultaneously solve for optimal values of both parameters that would make the predicted production value for that iteration substantially match (e.g., within a predetermined tolerance) the empirical production value for that iteration. In some examples, a first parameter may be optimizingly varied on a first schedule, and the second parameter may be optimizingly varied on a second iteration schedule. In some such examples, the first and second schedules may alternate every predetermined number of iterations. In some implementations, the first schedule and the second schedule may be different from each other. By way of example and not limitation, the first schedule may call for optimizingly varying the first parameter every 5 iterations, and the second schedule may call for optimizingly varying the second parameter on iterations during which the first parameter is not being varied.

In some embodiments that may include a hybrid comparison, the iteration may terminate repetition upon, for example, (1) the change in the first parameter being less than a first predetermined constancy threshold, and (2) the change in the second parameter being less than a second predetermined constancy threshold. The first and second predetermined constancy thresholds, in some examples, may be different from each other.

In various implementations, a computer-implemented process, which may include one or more operations of the computer-implemented processes 400, 500 described with reference to FIGS. 4-5, may be implemented via one or more programs of executable instructions, such as in the NVM 250 described with reference to FIG. 2, for example. Such executable instructions, when executed by the processor 245, for example, may be configured to perform operations to predict oil and/or gas production at an oil and gas production site. In some implementations, one or more operations to predict oil and/or gas production at an oil and gas production site may be performed in hardware, for example, by either discrete, integrated and/or hybrid circuits that may include analog and/or digital circuits, programmed and/or programmable devices (e.g., ASICs, FPGAs), taken either separately or collectively in combination with each other or software-implemented operations, which may be implemented using, for example, one or more processors, co-processors, digital signal processors, or other computational platform(s) known by those of ordinary skill in the art.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer-implemented method for predicting oil and/or gas production at an oil and gas production site, the method comprising:
    receiving input from a user identifying a database (230) containing information about an oil-gas extraction site (OGES), the information originating from sensors at the OGES;
    transmitting production data from the database (230) to a prediction engine (240);
    fitting a first monotonically decreasing function ($F_1$) to the production data over a first time period to generate a first production forecast, using the prediction engine (240);
    iteratively comparing, using the prediction engine (240): (1) a predicted production value ($Y_{pred,i}$) that is a function of the first monotonically decreasing function, with (2) an empirical production value ($Y_{emp,i}$), to iteratively determine whether the empirical production value is less than the predicted production value;
    if the empirical production value is less than the predicted production value ($Y_{emp,i} < Y_{pred,i}$), then iteratively determining a constant-rate decline rate ($D_{min,i}$) of the first monotonically decreasing function that matches the empirical production value;
    iteratively comparing, using the prediction engine (240): (1) a difference between successive constant-rate decline rates ($\Delta_i = D_{min,i} - D_{min,i-1}$), with (2) a predetermined error minimization threshold ($D_{thresh}$), to iteratively determine whether the difference between successive constant-rate decline rates ($\Delta_i$) is less than the predetermined error minimization threshold, wherein the predetermined error minimization threshold ($D_{thresh}$) is a user-defined parameter;
    if the difference between successive constant-rate decline rates ($\Delta_i$) is less than the predetermined error minimization threshold ($\Delta_i < D_{thresh}$), then determining a transition point (T) where the difference between successive constant-rate decline rates ($\Delta_i$) rate is less than the predetermined error minimization threshold; and,
    generating a second production forecast over a second time period as a function of a second monotonically decreasing function ($F_2$) different from the first monotonically decreasing function ($F_1$), using the prediction engine (240), wherein a combined production forecast comprises the first production forecast and the second production forecast, the first production forecast transitioning to the second production forecast at the transition point (T) in the combined production forecast.

2. The method of claim 1, wherein iteratively comparing the predicted production value ($Y_{pred,i}$) with the empirical production value ($Y_{emp,i}$) comprises comparing a predicted N-day moving average across N predicted production values with an empirical N-day moving average across N empirical production values.

3. The method of claim 2, wherein N=30 days.

4. The method of claim 1, wherein iteratively determining the constant-rate decline rate ($D_{min,i}$) comprises goal seeking the constant-rate decline rate.

5. The method of claim 1, further comprising:
    resetting a terminal decline rate ($D_{min}$) to a predetermined minimum rate value after each iteration of iteratively comparing the difference between successive constant-rate decline rates ($\Delta_i$) with the predetermined error minimization threshold ($D_{thresh}$).

6. The method of claim 5, wherein the predetermined minimum rate value is about 1%.

7. The method of claim 1, wherein the first monotonically decreasing function ($F_1$) comprises a hyperbolic Arps function.

8. The method of claim 7, wherein the second monotonically decreasing function ($F_2$) comprises an exponential Arps function.

9. The method of claim 8, wherein the terminal decline rate of the hyperbolic Arps function equals the constant decline rate of the Arps exponential function at the determined transition point (T).

10. A computer-implemented method for predicting oil and/or gas production at an oil and gas production site, the method comprising:
    receiving input from a user identifying a database (230) containing information about an oil-gas extraction site (OGES), the information originating from sensors at the OGES;
    transmitting production data from the database (230) to a prediction engine (240);
    fitting a first monotonically decreasing function ($F_1$) to the production data over a first time period to generate a first production forecast, using the prediction engine (240);
    iteratively comparing, using the prediction engine (240): (1) a predicted production value ($Y_{pred,i}$) that is a function of the first monotonically decreasing function, with (2) an empirical production value ($Y_{emp,i}$), to iteratively determine whether the empirical production value is less than the predicted production value;
    if the empirical production value is less than the predicted production value ($Y_{emp,i} < Y_{pred,i}$), then iteratively updating a parameter of the first monotonically decreasing function to match the empirical production value;
    iteratively comparing, using the prediction engine (240): (1) a difference ($\Delta_i$) between successive values of the updated at least one parameter, with (2) a predetermined error minimization threshold to determine, for each iteration, whether the difference ($\Delta_i$) between the successive values of the updated at least one parameter is less than the predetermined error minimization threshold;
    if the difference ($\Delta_i$) is less than the predetermined error minimization threshold, then determining a transition point (T) where the difference between successive parameter values ($\Delta_i$) is less than the predetermined error minimization threshold; and, generating a second production forecast over a second time period as a function of a second monotonically decreasing function ($F_2$) different from the first monotonically decreasing function ($F_1$), using the prediction engine (240), wherein a combined production forecast comprises the first production forecast and the second production forecast, the first production forecast transitioning to the second production forecast at the transition point (T) in the combined production forecast.

11. The method of claim 10, wherein the first monotonically decreasing function ($F_1$) comprises a hyperbolic Arps function.

12. The method of claim 11, wherein the second monotonically decreasing function ($F_2$) comprises an exponential Arps function.

13. The method of claim 10, wherein the updated at least one parameter of the first monotonically decreasing function comprises a b exponent ($b_{exp}$) of a hyperbolic function, and wherein the difference ($\Delta_i$) between successive values of the updated at least one parameter comprises the difference between successive b exponent values ($\Delta_i = b_{exp,i} - b_{exp,i-1}$).

14. The method of claim 10, wherein the updated parameter of the first monotonically decreasing function comprises a constant-rate decline rate ($D_{min,i}$), and wherein the difference ($\Delta_i$) between successive values of the updated at least one parameter comprises the difference between successive constant-rate decline rates ($\Delta_i = D_{min,i} - D_{min,i-1}$).

15. The method of claim 14, wherein the updated at least one parameter of the first monotonically decreasing function further comprises a b exponent ($b_{exp}$) of a hyperbolic function, and wherein the difference ($\Delta_i$) between successive values of the updated at least one parameter comprises the difference between successive b exponent values ($\Delta_i = b_{exp,i} - b_{exp,i-1}$).

16. The method of claim 10, wherein iteratively comparing the predicted production value ($Y_{pred,i}$) with the empirical production value ($Y_{emp,i}$) comprises comparing a predicted N-day moving average across N predicted production values with an empirical N-day moving average across N empirical production values.

17. A computer-implemented method for predicting oil and/or gas production at an oil and gas production site, the method comprising:

receiving input from a user identifying a database (230) containing information about an oil-gas extraction site (OGES), the information originating from sensors at the OGES;

transmitting production data from the database (230) to a prediction engine (240);

fitting a first monotonically decreasing function ($F_1$) to the production data over a first time period to generate a first production forecast, using the prediction engine (240);

iteratively comparing, using the prediction engine (240): (1) a predicted production value ($Y_{pred,i}$) that is a function of the first monotonically decreasing function, with (2) an empirical production value ($Y_{emp,i}$), to iteratively determine whether the empirical production value is less than the predicted production value;

if the empirical production value is less than the predicted production value ($Y_{emp,i} < Y_{pred,i}$), then iteratively determining a constant-rate decline rate ($D_{min,i}$) of the first monotonically decreasing function that matches the empirical production value by applying a Newton-Raphson bisection method to optimizingly determine the constant-rate decline rate ($D_{min,i}$);

iteratively comparing, using the prediction engine (240): (1) a difference between successive constant-rate decline rates ($\Delta_i = D_{min,i} - D_{min,i}$), with (2) a predetermined error minimization threshold ($D_{thresh}$), to iteratively determine whether the difference between successive constant-rate decline rates ($\Delta_i$) is less than the predetermined error minimization threshold;

if the difference between successive constant-rate decline rates ($\Delta_i$) is less than the predetermined error minimization threshold ($D_{min,i} < D_{thresh}$), then determining a transition point (T) where the difference between successive constant-rate decline rates ($\Delta_i$) is less than the predetermined error minimization threshold;

generating a second production forecast over a second time period as a function of a second monotonically decreasing function ($F_2$) different from the first monotonically decreasing function ($F_1$), using the prediction engine (240), wherein a combined production forecast comprises the first production forecast and the second production forecast, the first production forecast transitioning to the second production forecast at the transition point (T) in the combined production forecast.

18. The computer-implemented method of claim 17, wherein iteratively comparing the predicted production value ($Y_{pred,i}$) with the empirical production value ($Y_{emp,i}$) comprises comparing a predicted N-day moving average across N predicted production values with an empirical N-day moving average across N empirical production values.

19. The computer-implemented method of claim 17, wherein the first monotonically decreasing function ($F_1$) comprises a hyperbolic Arps function.

20. The computer-implemented method of claim 19, wherein the second monotonically decreasing function ($F_2$) comprises an exponential Arps function.

* * * * *